United States Patent
Jo

(10) Patent No.: US 9,682,654 B2
(45) Date of Patent: Jun. 20, 2017

(54) APPARATUS AND METHOD FOR WARNING LOSS OF CONTROL OF A VEHICLE USING VEHICLE-TO-VEHICLE COMMUNICATIONS

(71) Applicant: HYUNDAI MOBIS CO., LTD., Seoul (KR)

(72) Inventor: Jang Hyeon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 18 days.

(21) Appl. No.: 14/807,672

(22) Filed: Jul. 23, 2015

(65) Prior Publication Data

US 2016/0023599 A1 Jan. 28, 2016

(30) Foreign Application Priority Data

Jul. 28, 2014 (KR) .......................... 10-2014-0095879

(51) Int. Cl.
G08B 21/00 (2006.01)
B60Q 9/00 (2006.01)
G08G 1/16 (2006.01)

(52) U.S. Cl.
CPC ............. B60Q 9/008 (2013.01); G08G 1/161 (2013.01)

(58) Field of Classification Search
CPC ................................ B60Q 9/008; G08G 1/161
USPC ......................................................... 340/903
See application file for complete search history.

(56) References Cited

U.S. PATENT DOCUMENTS

| 2004/0061600 A1* | 4/2004 | Wehner | G01S 5/0072 340/435 |
| 2004/0254729 A1* | 12/2004 | Browne | B60R 21/013 701/301 |
| 2007/0106474 A1* | 5/2007 | Ide | B60R 21/013 701/301 |
| 2011/0249118 A1* | 10/2011 | Bruno | B60W 30/0953 348/148 |
| 2013/0060400 A1* | 3/2013 | Hahne | G08G 1/161 701/1 |

FOREIGN PATENT DOCUMENTS

KR 10-1117168 B1 3/2010

* cited by examiner

*Primary Examiner* — Mark Rushing
(74) *Attorney, Agent, or Firm* — Knobbe Martens Olson & Bear LLP

(57) ABSTRACT

An apparatus for warning loss of control of a vehicle using communications between vehicles may include: a speed detecting unit for detecting a speed of a vehicle; a position detecting unit for detecting a current position and a travel direction of the vehicle; a route estimating unit for estimating a future position of the vehicle after a time period using the current speed and the position information; a WAVE message generating unit for generating a WAVE message comprising the future position information of the vehicle; a WAVE data communicating unit for broadcasting the WAVE message to a surrounding vehicle and an infrastructure periodically, and receiving WAVE message broadcast from the surrounding vehicle and the infrastructure; and a control unit for sensing accident risk using the future position information of the vehicle and the future position information of the surrounding vehicle, when the surrounding vehicle is in loss of control.

7 Claims, 4 Drawing Sheets

US 9,682,654 B2

APPARATUS AND METHOD FOR WARNING LOSS OF CONTROL OF A VEHICLE USING VEHICLE-TO-VEHICLE COMMUNICATIONS

CROSS-REFERENCES TO RELATED APPLICATIONS

The present application claims priority to Korean application number 10-2014-0095879, filed on Jul. 28, 2014, which is incorporated by reference in its entirety.

BACKGROUND

1. Field

The present disclosure relates to an apparatus and method for warning loss of control of a vehicle using vehicle-to-vehicle communications.

2. Discussion of Related Technology

Recently the studies on communications between a vehicle and a vehicle (Vehicle to Vehicle: V2V) and communications between a vehicle and an infrastructure (Vehicle to Infrastructure: V2I) based on WAVE (Wireless Access in Vehicular Environments) has been progressed.

The related technology is disclosed in Korean Patent No. 10-1117168 issued on Feb. 9, 2012 and entitled "Telematics apparatus and method for a vehicle for providing surrounding information to a vehicle using V2V communications".

SUMMARY

Embodiments of the present invention are directed to an apparatus and a method for warning loss of control of a vehicle using communications between the vehicles wherein when an own vehicle is out of control during travelling of the own vehicle the own vehicle broadcasts its status information to surrounding vehicles, and the own vehicle which receives status information pointing to the out-of-control from the surrounding vehicles can warn a risk to a driver to prevent the traffic accident.

An apparatus for warning loss of control of a vehicle using communications between vehicles in accordance with an embodiment of the present invention may include a speed detecting unit for detecting a travel speed of an own vehicle; a position detecting unit for detecting a current position and a travel direction of the own vehicle; a route estimating unit for estimating a future position of the own vehicle after a predetermined time period using the current speed and the position information; a WAVE message generating unit for generating a WAVE message comprising the future position information of the own vehicle after the predetermined time period; a WAVE data communicating unit for broadcasting the WAVE message to surrounding vehicles and an infrastructure periodically, and receiving the WAVE message broadcast from the surrounding vehicles and the infrastructure; a control unit for sensing accident risk using the future position information of the own vehicle and the future position information of the surrounding vehicles, when one of the surrounding vehicles is in loss of control; and a guide and alarm output unit for warning the accident risk by an audible means, a visible means, and a vibrating means in combination under the control of the control unit in advance, or providing behavior guides to a driver to prevent the traffic accident in advance.

In another embodiment, the behavior guides of the driver to prevent the accident may include at least one of braking, turning, emergency lighting, and emergency beeping.

In another embodiment, the position detecting unit may detect the current position of the own vehicle using at least one of a position information collecting module provided in the own vehicle, a GPS/GNSS module, and electronic map information.

In another embodiment, the control unit may sense the accident risk by sensing at least one of an ahead zone in the same travel direction as that of the own vehicle, a left/right lane zone adjacent to the ahead zone, a behind zone, a left/right lane zone adjacent to the behind zone, a front lane zone approaching from the front, and an intersecting left/right lane zone.

In another embodiment, the WAVE (Wireless Access in Vehicular Environments) message may include at least one of a position and a status of the vehicle, at least one event information, whether there is the loss of control or not, and operating status information including ABS (Anti-Lock Brake System), ESC (Electronic Stability Control), and TCS (Traction Control System) as its detail information.

A method for warning loss of control of a vehicle using communications between vehicles in accordance with an another embodiment of the present invention may include sensing, by a control unit, at least one vehicle abnormal signals generated by actuating a function of the vehicle according to an operating maneuver performed by a driver in an emergency situation which is encountered during travelling of the own vehicle; determining, by the control unit, whether a current speed of the vehicle is above a predefined threshold at the same time when the vehicle abnormal signal is sensed, or within a predefined time period; further sensing, by the control unit, vehicle abnormal status information, when the current speed of the vehicle is above the threshold while the vehicle abnormal signal is sensed; determining, by the control unit, that the vehicle is in loss of control status, when the current speed of the vehicle is above the threshold while the vehicle abnormal signal is sensed, and also the vehicle abnormal status information is sensed; generating, by the control unit, a WAVE message where the loss-of-control status is recorded in a particular field for recording event information in the WAVE message via a WAVE message generating unit; and broadcasting, by the control unit, the WAVE message to the surrounding through the WAVE data communicating unit.

In another embodiment, the vehicle abnormal status information may include at least one of a status that an acceleration/deceleration value of the vehicle is abruptly varied in a unit time, a status that a vehicle steering angle is abruptly varied in a unit time, a status that a vehicle projectile (Longitudinal and Latitudinal Distance) is abruptly varied in a unit time, and a status that the vehicle maneuver which is not fitted with a geometrical structure of the corresponding road is sensed on comparing with the map information.

A method for warning loss of control of a vehicle using communications between vehicles in accordance with an another embodiment of the present invention may include receiving, under the control of a control unit, a WAVE message broadcast from surrounding vehicles using a WAVE data communicating unit; analyzing, by the control unit, the WAVE message and, when the WAVE message contains status information pointing to the loss of control, calculating relative positions between an own vehicle and the surrounding vehicles using the status information contained in the WAVE message; deciding, by the control unit, whether a position of the own vehicle is in a range of possible accident risk with the surrounding vehicles using the relative positions between the own vehicle and the surrounding vehicles; and when the own vehicle is positioned in the range of possible accident risk, detecting, by the control unit, a travel speed of the own vehicle, and outputting a guide and alarm to prevent an accident via a guide and alarm output unit assuming that there is a possible risk that the accident will take place when the travel speed is above a predefined threshold.

In another embodiment, after outputting the guide and alarm, the method may further include: stopping, by the control unit, outputting the guide and alarm, when the conditions of the possible risk that the accident will take place is released, wherein the release of the conditions of the possible risk that the accident will take place may include that the speed of the own vehicle is reduced by braking of the driver, or the loss of control of the surrounding vehicles is released.

In another embodiment, in deciding whether the position of the own vehicle is in the range of the possible accident risk with the surrounding vehicles, the control unit may decide at least one of whether the distance of the surrounding vehicles in the front/rear in the same lane as that of the own vehicle is in a predefined first threshold, whether the distance of the surrounding vehicles in the front/rear in the lane adjacent to that of the own vehicle is in a second threshold, whether the distance of the surrounding vehicle when the surrounding vehicles approach from the front is in a third threshold, or whether the distance to the intersection points of the surrounding vehicles and the own vehicle which are intersected in the intersection is in a fourth threshold.

The apparatus and method for warning loss of control of a vehicle using vehicle-to-vehicle communications according to embodiments of the present invention have the advantages that it can propagate status information of an own vehicle to surrounding vehicles when loss of control of the own vehicle takes place during travelling of an own vehicle, and warn a possible risk that an accident will take place to a driver to prevent a traffic accident in advance when the own vehicle which receives the status information pointing to the loss-of-control of a vehicle from the surrounding vehicles, thus achieving efficiency of a traffic flow.

One aspect of the invention directed to warning a driver of a vehicle of loss of control of another vehicle using vehicle-to-vehicle communications. When a vehicle loses its control while driving, the vehicle generates and broadcasts a WAVE (Wireless Access in Vehicular Environments) message indicative of its loss of control such that other vehicle driving nearby can receive the message. When a vehicle receives such a WAVE message, it's control system analyzes the received message and determines that the message contains information indicative of loss of control of the other vehicle that broadcast the message. When the message contains such loss-of-control information, the control system of the message-receiving vehicle computes its position or distance relative to the message-issuing vehicle based on information contained in the message and GPS and determines if two vehicles are within a predetermined range of possible accident risk. When the two vehicles are within the range of possible accident risk and when the message recipient vehicle is driving at a speed higher than a predetermined speed, the control system issues a warning to the driver.

DESCRIPTION OF EMBODIMENTS

In the following, an embodiment of an apparatus and method for warning loss of control of a vehicle using communications between vehicles according to an embodiment of the present invention will be described with reference to the accompanying drawings.

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Technologies for providing simple operating information such as an alarm of quick braking, an alarm of front-end collision, lighting of a turn signal lamp, etc. of a vehicle to the surrounding vehicles can be realized using the vehicle-vehicle communications (V2V) or the vehicle-infrastructure communications (V2I). However, the technologies may simply provide the propagation of the operating status to the surrounding vehicles, and does not provide any devices or methods to avoid a traffic accident in advance or to optimize a traffic system by achieving efficiency of a traffic flow.

One aspect of the present invention relates to an apparatus and method for warning loss of control of a vehicle using communications between the vehicles based on WAVE (Wireless Access in Vehicular Environments), wherein the vehicle does not propagate simple operating information of the vehicle, but firstly estimate possible risk information that may cause a traffic accident and then propagate the estimated risk information to the surrounding vehicles, so that a driver of the surrounding vehicles can recognize the risk of a traffic accident and take the proper measure in advance, thus preventing the traffic accident, when the vehicle is out of control or inoperative, for example, when ABS (Anti-Lock Brake System), ESC (Electronic Stability Control), TCS (Traction Control System), etc. is operated and thus the risk of the traffic accident is high.

Figure 1:
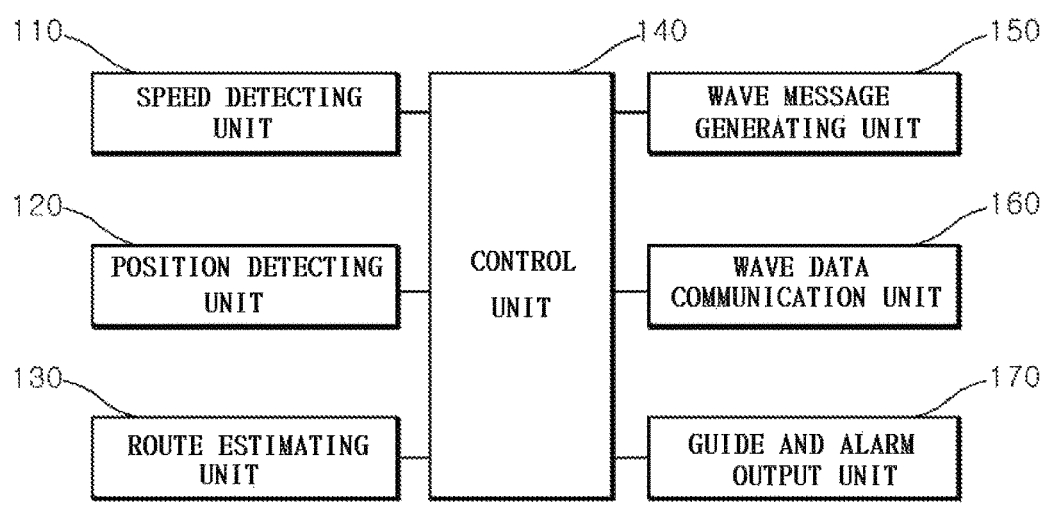
FIG. 1 is a diagram showing a schematic configuration of an apparatus for warning loss of control of a vehicle using communications between vehicles according to an embodiment of the present invention.

FIG. 1 is a diagram showing a schematic configuration of an apparatus for warning loss of control of a vehicle using communications between the vehicles according to an embodiment of the present invention.

As shown in FIG. 1, an apparatus for warning loss of control of a vehicle using communications between the vehicles according to an embodiment of the present embodiment may comprise a speed detecting unit 110, a position detecting unit 120, a route estimating unit 130, a control unit 140, a WAVE message generating unit 150, a WAVE data communicating unit 160, and a guide and alarm output unit 170.

The speed detecting unit 110 is to detect a travel speed of an own vehicle (HV: Host Vehicle)(e.g., a vehicle where a driver operates), wherein the speed detecting unit receives speed information detected by a vehicle speed sensor by communicating (e.g., via CAN communications) with a vehicle control unit (e.g., ECU) in real time, or detect a speed of the vehicle separately using GPS/GNSS information received via GPS/GNSS (Global Positioning System/Global Navigation Satellite System) module.

For example, the own vehicle (HV) may include a speed sensor for detecting its speed of the own vehicle via the speed sensor. Usually the speed detected using the GPS/GNSS information can be more accurate.

The position detecting unit 120 is not only used to detect a current position of the vehicle, but also used to detect the speed of the vehicle.

The position detecting unit 120 may detect the current position of the vehicle using at least one of a position information collecting module provided in the vehicle, GPS/GNSS module, and an electronic map information. That is, the position detecting unit 120 may detect a position where the vehicle travels currently and a direction information (i.e., a heading value: an angle, which is information pointing to a direction along which the vehicle travels, assuming that a direction pointing to a reference point is 0 degree).

And, the own vehicle (HV) and the surrounding vehicles (RV: Relative Vehicle) (i.e., vehicles positioned in a predetermined distance from the own vehicle) may exchange the position information each other, so that the own vehicle (HV) may recognize relative direction and position where the surrounding vehicles (RV) travels relative to the direction and position where the own vehicle travels.

Figure 2:
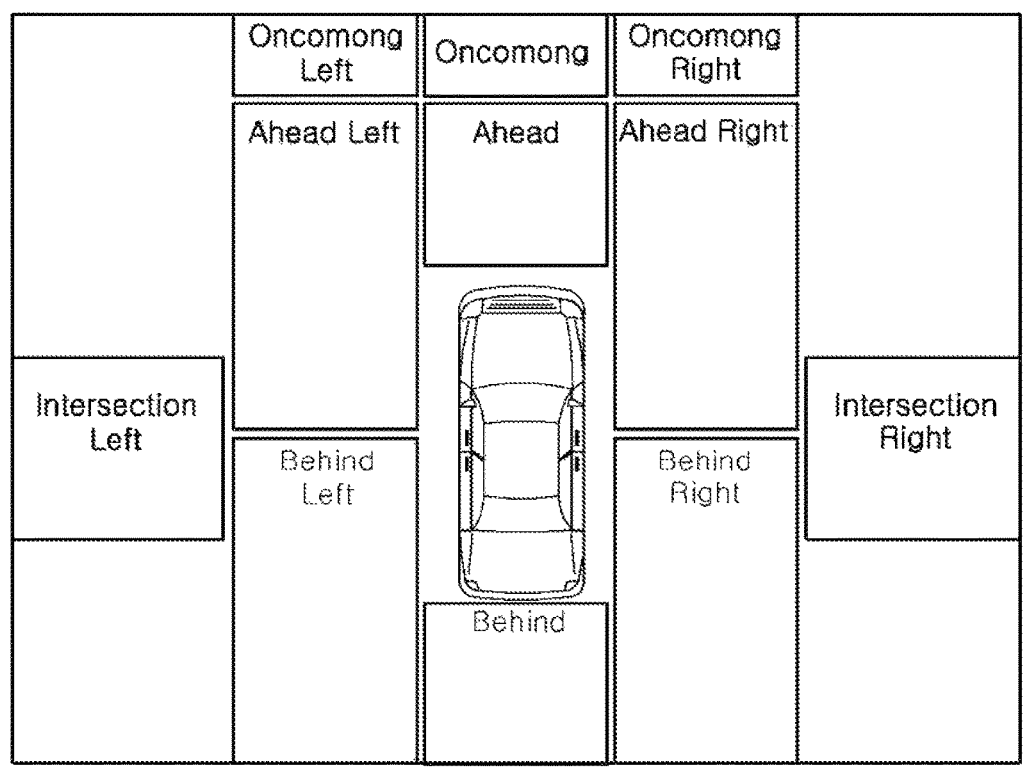
FIG. 2 is a diagram showing zones for detecting positions of surrounding vehicles relative to an own vehicle in FIG. 1.

Here, the position of the surrounding vehicles (RV) may comprise an ahead zone (Ahead) in the same travel direction as that of the own vehicle (HV), a left/right lane zone (Ahead Left/Right) adjacent to the ahead zone, a Behind zone, a left/right lane zone (Behind Left/Right) adjacent to the behind zone, a front lane zone (Oncoming Front/Left/Right) approaching in the front, and an intersecting left/right lane zone (Intersecting Left/Right), etc., as shown in FIG. 2.

FIG. 2 is a diagram showing zones for detecting positions of the surrounding vehicles relative the own vehicle in FIG. 1.

The route estimating unit 130 may calculate a position where the own vehicle (HV) would like to travel on the road at a future (e.g., after several seconds or after several milliseconds) from the current time of point using the current speed and position information of the own vehicle (HV). That is, the route estimating unit 130 may estimate the future position of the own vehicle (HV) using the current speed and the position information of the own vehicle.

The control unit 140 may generate a WAVE message comprising future position information of the own vehicle (HV) calculated by the route estimating unit 130 using the WAVE message generating unit 150, and broadcast the WAVE message to the surrounding vehicles (RV) and an infrastructure periodically (e.g., 100 ms) using the WAVE data communicating unit 160 via V2V and V2I communications.

The WAVE message generating unit 150 may generate periodically (e.g., 100 ms) BSM (Basic Safety Message) (or WAVE message). At this time the BSM (Basic Safety Message) may comprise the position and status of the vehicle, at least one event information, whether loss of control of a vehicle takes place, and its detail information (e.g., actuating status of ABS, ESC, TCS), etc.

Here, the loss-of-control (or inoperable) status may comprise a status such as quick braking of the vehicle, sharp turning, abrupt steering adjusting, unstabilizing of a vehicle body (e.g., wagging, vehicle pulling, etc.) and the like, and the loss-of-control status may be determined by taking the operating statuses of at least one particular functions (e.g., ABS, ESC, TCS, etc.) related to the activation of the vehicle in combination into account.

On the other hand, the WAVE message may further comprise auxiliary information (e.g., speed information, acceleration pedal actuating information, brake actuating information, handle actuating information, turn signal lamp actuating information, etc.) detected from the vehicle control unit (e.g., ECU).

The WAVE data communicating unit 160 may broadcast the BSM (or WAVE message) generated by the WAVE message generating unit 150 to the surrounding, and receive the BSM (or WAVE message) broadcasted by the surrounding vehicles. That is, the own vehicle (HV) and the surrounding vehicles (RV) may exchange its vehicle information in real time via the WAVE data communicating unit 160.

Furthermore when there are base stations (Road Side Equipment) at the sides of the road the WAVE data communicating unit 160 may exchange information between the own vehicle (HV) and the base station in real time via V2I communications.

The guide and alarm output unit 170 may provide or warn the accident risk to the driver when the surrounding vehicles (RV) is out of control from the WAVE message of the surrounding vehicles (RV) received via the WAVE data communicating unit 160 or when the accident risk between the own vehicle (HV) and the surrounding vehicles (RV) is sensed (e.g., when the accident risk is sensed using the future position information of the own vehicle and the future position information of the surrounding vehicles estimated via the route estimating unit).

The guide and alarm output unit 170 may warn the accident risk (e.g., front-end collision, rear-end collision, etc.) using the audible means, visible means, and vibrating means in combination in advance, or provide proper behavior guides to the driver to prevent a traffic accident in advance, so that the driver can take proper behaviors (e.g., braking, turning, emergency lighting, emergency beeping, etc.) to prevent the traffic accident.

In the following, an embodiment according to the present invention will be described in a situation where one of the surrounding vehicles (RV) is out of control and the own vehicle (HV) will perform the operation for outputting guide or alarm to prevent the traffic accident by sensing the status information pointing to the out-of-control of the surrounding vehicles (RV). However, the own vehicle (HV) and the surrounding vehicles (RV) are in practice in a relative relationship each other, for convenience it will be described assuming that the vehicle to be operated is the own vehicle (HV).

Figure 3:
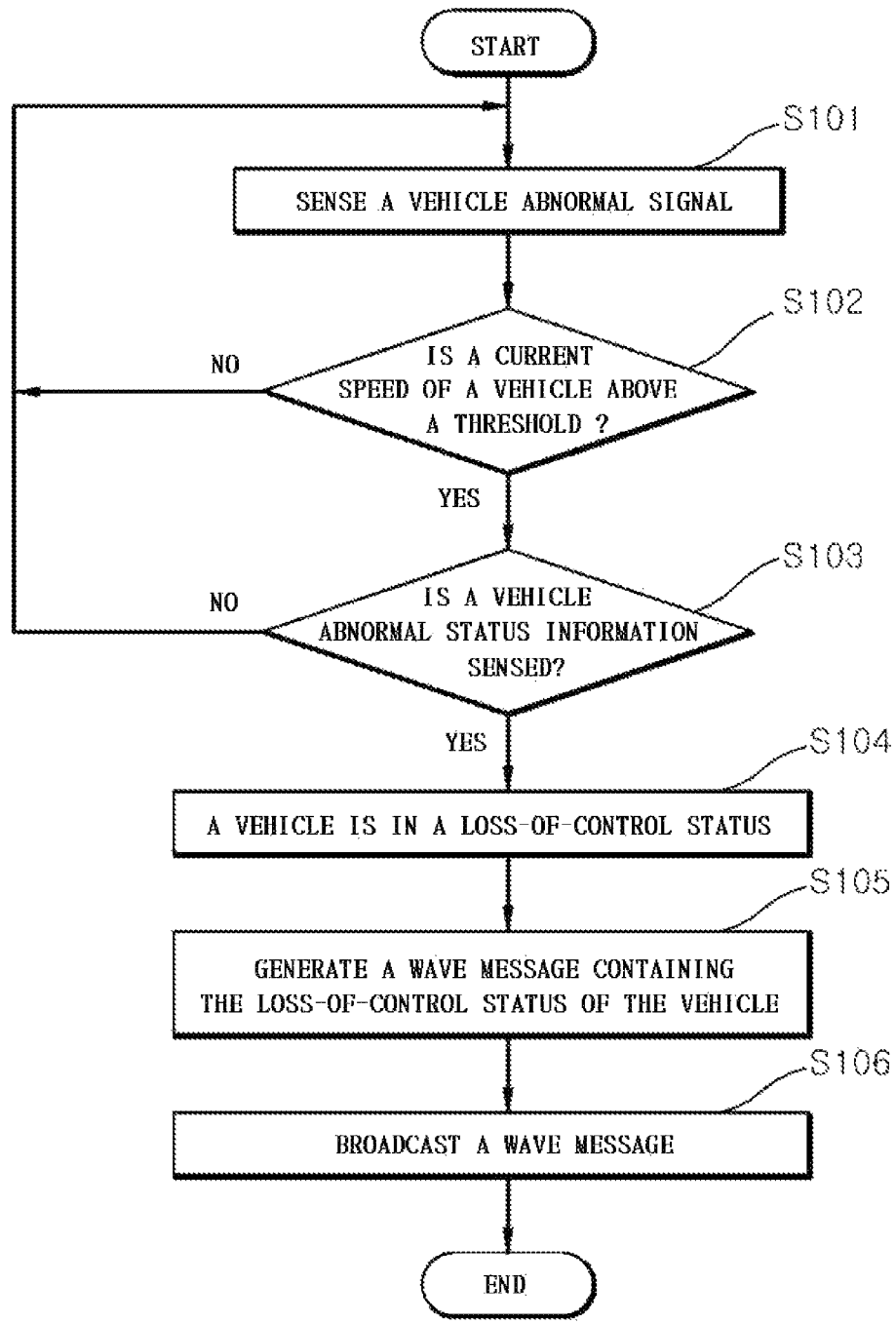
FIG. 3 is a flow chart for illustrating a method for warning loss of control of a vehicle using communications between the vehicles according to a first embodiment of the present invention.

FIG. 3 is a flow chart for illustrating a method for warning loss of control of a vehicle using communications between the vehicles according to a first embodiment of the present invention.

That is, FIG. 3 is a flow chart for illustrating a method for broadcasting a WAVE message containing the status information pointing to the loss of control generated by the own vehicle (HV) which is in loss of control to the surrounding, wherein the own vehicle (HV) which is in loss of control broadcasts its status to the surrounding via V2V-based WAVE communications. That is, the own vehicle (HV) broadcasts the WAVE message containing the status information pointing to the loss of control to the surrounding.

Referring to FIG. 3, when the own vehicle (HV) encountered urgent situations during travelling (e.g., finding a road obstacle, travelling on a lubricant surface, changing of a geometrical structure of the road, etc.), the driver may act quick braking, abrupt handle actuating, etc., and thus the own vehicle (HV) may actuate the function (or apparatus) corresponding to the manipulation performed by the driver.

For example, the function (or apparatus) corresponding to the manipulation performed by the driver may comprise ABS (Anti-Lock Brake System), ESC (Electronic Stability Control), and TCS (Traction Control System), etc.

Then, the control unit 140 may sense at least one abnormal signals of the vehicle according to the actuation of the functions (S101). And, the control unit 140 may decide whether the current speed of the vehicle is above a predefined threshold (Threshold Value) at the same time when the abnormal signal of the vehicle is sensed (or within a predetermined time period from the sensed time) (S102).

As mentioned in the above, when the current speed of the vehicle is above the threshold at the same time when the abnormal signal of the vehicle is sensed (YES in S102), the control unit 140 may further sense the abnormal status information of the vehicle to decide whether the vehicle is out of control.

For example, the abnormal status information of the vehicle may comprise at least one of a status that an acceleration/deceleration value of the vehicle is varied abruptly in a unit time, a status that a vehicle steering angle is varied abruptly in a unit time, a status that a vehicle travel projectile (Longitudinal and Latitudinal Distance) is varied abruptly in a unit time, and a status that the vehicle maneuver which is not fitted with the geometrical structure of the corresponding road on comparing with the map information is sensed.

The control unit 140 may decide that the vehicle is in loss of control when the current speed of the vehicle is above the threshold and at the same time when the abnormal signal of the vehicle is sensed (or within a predetermined time period), and also when the status information pointing to the abnormal status of the vehicle is sensed (YES in S103) (S104).

And, the control unit 140 may generate a WAVE message (or BSM) where the loss-of-control event is recorded as 'ON' in a particular field (e.g., data field for writing event information) in the WAVE message (or BSM) via the WAVE message generating unit 150 (S105).

Then the control unit 140 may broadcast the WAVE message to the surrounding using the WAVE data communicating unit 160 (S106).

Figure 4:
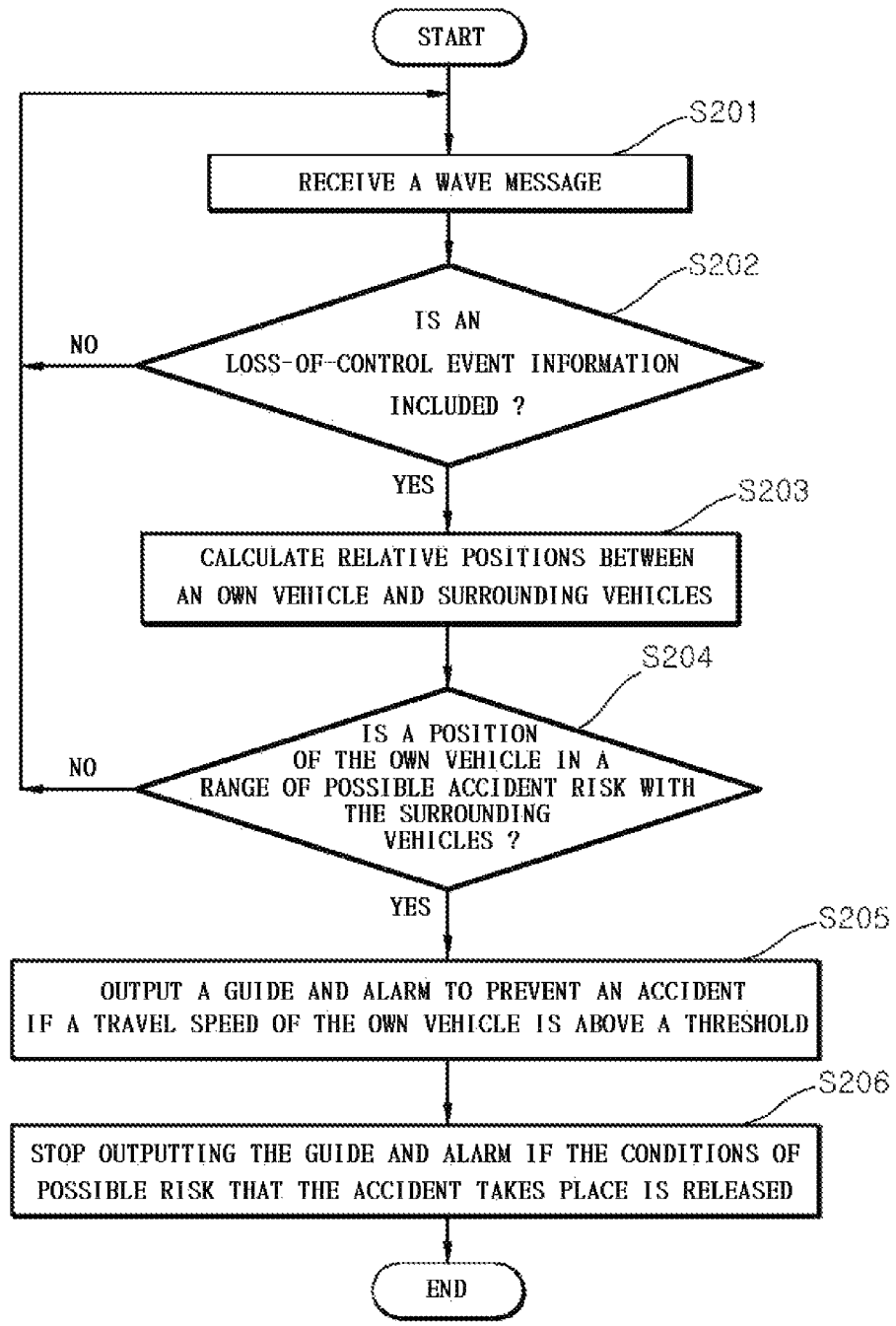
FIG. 4 is a flow chart for illustrating a method for warning loss of control of a vehicle using communications between the vehicles according to a second embodiment of the present invention.

FIG. 4 is a flow chart for illustrating a method for warning loss of control of a vehicle using communications between the vehicles according to a second embodiment of the present invention.

That is, FIG. 4 is a flow chart illustrating a method for outputting a guide and alarm from an own vehicle (HV) when the own vehicle receives a WAVE message comprising the status information pointing to the loss-of-control from the surrounding vehicles (RV), wherein the own vehicle (HV) which received the V2V based WAVE message from the surrounding vehicles (RV) which is in loss of control, warns the accident risk (e.g., front-end collision, rear-end collision, etc.) in advance, or provides proper behavior guides (e.g., braking, turning, emergency lighting, emergency beeping, etc.) to prevent the traffic accident in advance.

Referring to FIG. 4, the control unit (140) may receive the WAVE message broadcast from the surrounding vehicles (RV) via the WAVE data communicating unit 160 (S201).

And, when the control unit 140 analyzes the WAVE message and finds that 'ON' pointing to the loss-of-control event is contained in the WAVE message (YES in S202), the control unit may calculate relative positions between the own vehicle (HV) and the surrounding vehicles (RV) using event information contained in the WAVE message (S203).

For example, as the WAVE message may comprise the position information of the surrounding vehicles (RV), the control unit may calculate (estimate) relative positions and routes between the own vehicle (HV) and the surrounding vehicles (RV) using the position and speed information detected by the own vehicle (HV).

And, the control unit (140) may decide whether the position of the own vehicle (HV) is in the range of possible accident risk with the surrounding vehicles (RV) using the relative positions between the own vehicle (HV) and the surrounding vehicles (RV) (S204).

For example, the control unit (140) may decide whether the distance of the surrounding vehicles (RV) in the front/rear in the same lane as that of the own vehicle (HV) is in a predefined first threshold (e.g., several meters), whether the distance of the surrounding vehicles (RV) in the front/rear in the lane adjacent to that of the own vehicle (HV) is in a second threshold (e.g., several meters), whether the distance (Oncoming Distance) of the surrounding vehicle when the surrounding vehicles (RV) approach in the front is in a third threshold (e.g., several meters), or whether the distance to the intersection points of the surrounding vehicles (RV) and the own vehicle (HV) which are intersected in the intersection is in a fourth threshold (e.g., several meters). That is, when the control unit 140 detects at least one of these conditions, the control unit may decide that the position of the own vehicle (HV) is in the range of possible accident risk with the surrounding vehicles (RV).

Like above, when the position of the own vehicle (HV) is in the range of possible accident risk (YES in S204), the control unit 140 may detect the travel speed of the own vehicle (HV). And, the travel speed of the own vehicle (HV) is above the predefined threshold (i.e., fifth threshold), the control unit may decide that there is a possible risk that the traffic accident will take place, and output the guide and alarm to prevent the traffic accident via the guide and alarm output unit 170 (S205).

And, after the control unit 140 outputs the guide and alarm to prevent the traffic accident, if the conditions of the possible risk that the accident will take place is released (e.g., if the speed of the own vehicle is reduced by braking of the driver after outputting the alarm, or if the loss-of-control status of the surrounding vehicles is released after outputting the alarm, etc.), the control unit may stop outputting the guide and alarm (S206).

On the other hand, in embodiments, it is possible that a surrounding vehicle which is in loss of control may transmit the traffic accident and urgent information to the authorities such as a police station/fire station/emergency center by transmitting its status and position information to the base station on the side of the road via V2I communications.

While the present invention have been described with reference to embodiments shown in the drawings, the present invention is described only for illustration and are not limited to the embodiments described herein. It will be thus appreciated by the skilled person in the art that various variants or modifications may be made without departing from the scope and spirit of the invention. Therefore, the scope of the present invention should be defined only in accordance with the following claims and their equivalents.

What is claimed is:

1. An apparatus for warning communications between vehicles, comprising:
   a route estimating unit configured for estimating a future position of a vehicle using a current speed and a current position of the vehicle;
   a WAVE data communication unit configured for receiving WAVE messages broadcast from nearby vehicles;
   a control unit configured for estimating a risk of an accident with one or more nearby vehicles using the future position of the vehicle and WAVE messages from nearby vehicles; and
   an alarm output unit configured for warning the risk of an accident with one or more nearby vehicles,
   wherein when a WAVE message received from a first nearby vehicle comprises a loss-of-control status indicating that the first nearby vehicle has lost its control, the control unit is configured to estimate the risk of an accident between the vehicle and the first nearby vehicle using the future position of the vehicle estimated by the route estimating unit and further using an estimated future position at a future time of the first nearby vehicle contained in the WAVE message,
   wherein when the control unit's estimated risk of an accident is at a predetermined level or higher, the alarm output unit is configured to output a warning about the risk of an accident for a driver of the vehicle,
   wherein when a subsequent WAVE message received from the first nearby vehicle comprises the loss-of-control status indicating that the first nearby vehicle has gained its control while the alarm output unit is outputting the warning about the risk of an accident, the control unit is configured to cause the alarm output unit to stop outputting the warning.

2. The apparatus according to claim 1, wherein the warning comprise at least one of emergency lighting and emergency beeping.

3. The apparatus according to claim 1, wherein the WAVE (Wireless Access in Vehicular Environments) messages from the first nearby vehicle further comprises, operating status of an ABS (Anti-Lock Brake System), an ESC (Electronic Stability Control), and a TCS (Traction Control System) in the first nearby vehicles.

4. A method for warning using communications between vehicles, comprising:
   estimating, using a route estimating unit, a future position of a vehicle using a current speed and a current position of the vehicle;
   receiving, using a WAVE data communication unit, WAVE messages broadcast from nearby vehicles;
   estimating, using a control unit, a risk of an accident with one or more nearby vehicles using the future position of the vehicle and WAVE messages from nearby vehicles; and
   wherein when a WAVE message received from a first nearby vehicle comprises a loss-of-control status indicating that the first nearby vehicle has lost its control, the control unit is configured to estimate the risk of an accident between the vehicle and the first nearby vehicle using the future position of the vehicle estimated by the route estimating unit and further using an estimated future position at a future time of the first nearby vehicle contained in the WAVE message,
   wherein when the control unit's estimated risk of an accident is at a predetermined level or higher, the control unit is configured to cause an alarm output unit to output a warning about the risk of an accident for a driver of the vehicle,
   wherein when a subsequent WAVE message received from the first nearby vehicle comprises the loss-of-control status indicating that the first nearby vehicle has gained its control while the alarm output unit is outputting the warning about the risk of an accident, the control unit is configured to cause the alarm output unit to stop outputting the warning.

5. The method of claim 4, further comprising:
   monitoring operation of an ABS (Anti-Lock Brake System), an ESC (Electronic Stability Control), and a TCS (Traction Control System) in the vehicle;
   generating a WAVE message comprising a loss-of-control status indicating that the vehicle has lost its control when at least one of the ABS, the ESC, and the TCS of the vehicle is not operative; and
   broadcasting the WAVE message comprising the loss-of-control status indicating that the vehicle has lost its control such that the WAVE message can be received by nearby vehicles.

6. The method according to claim 4, wherein the control unit is configured to cause the alarm output unit to stop outputting the warning when speed of the vehicle is reduced by braking of the driver.

7. The method according to claim 4, wherein estimating the risk of an accident comprises determining whether the vehicle is within a predetermined range of possible accident from at least one of the nearby vehicles.

* * * * *